United States Patent [19]

Fussgänger

[11] Patent Number: 4,739,501
[45] Date of Patent: Apr. 19, 1988

[54] OPTICAL MULTIPLEXER/DEMULTIPLEXER

[75] Inventor: Kurt Fussgänger, Remseck, Fed. Rep. of Germany

[73] Assignee: Alcatel N.V., Amsterdam, Netherlands

[21] Appl. No.: 771,451

[22] Filed: Aug. 30, 1985

[30] Foreign Application Priority Data

Sep. 1, 1984 [DE] Fed. Rep. of Germany ....... 3432239

[51] Int. Cl.$^4$ .............................................. H04J 1/04
[52] U.S. Cl. ..................................... 370/3; 350/96.18; 350/96.19
[58] Field of Search .............. 370/3; 350/96.15, 96.18, 350/96.19

[56] References Cited

U.S. PATENT DOCUMENTS 4,422,733 12/1983 Kikuchi et al. ..................... 350/413
4,557,566 12/1985 Kikuchi et al. .................. 350/96.19

FOREIGN PATENT DOCUMENTS 56-155902 12/1981 Japan ............................... 350/96.19

OTHER PUBLICATIONS

Gillham et al.—Fiber Couplers for Multiplexing—Photonics Speedra, vol. 18, #4, Apr. 1984, pp. 45, 46, 48, 49, 50, 52.
Yen et al.—"Planar Rowland Spectrometer"—Optics Letters—vol. 6, No. 12—Dec. 1981, pp. 639-641.

Primary Examiner—Joseph A. Orsino, Jr.
Attorney, Agent, or Firm—Christie, Parker & Hale

[57] ABSTRACT

An optical multiplexer/demultiplexer is disclosed in which a reflection grating (1) is formed on a hemispherical lens (2).

6 Claims, 3 Drawing Sheets

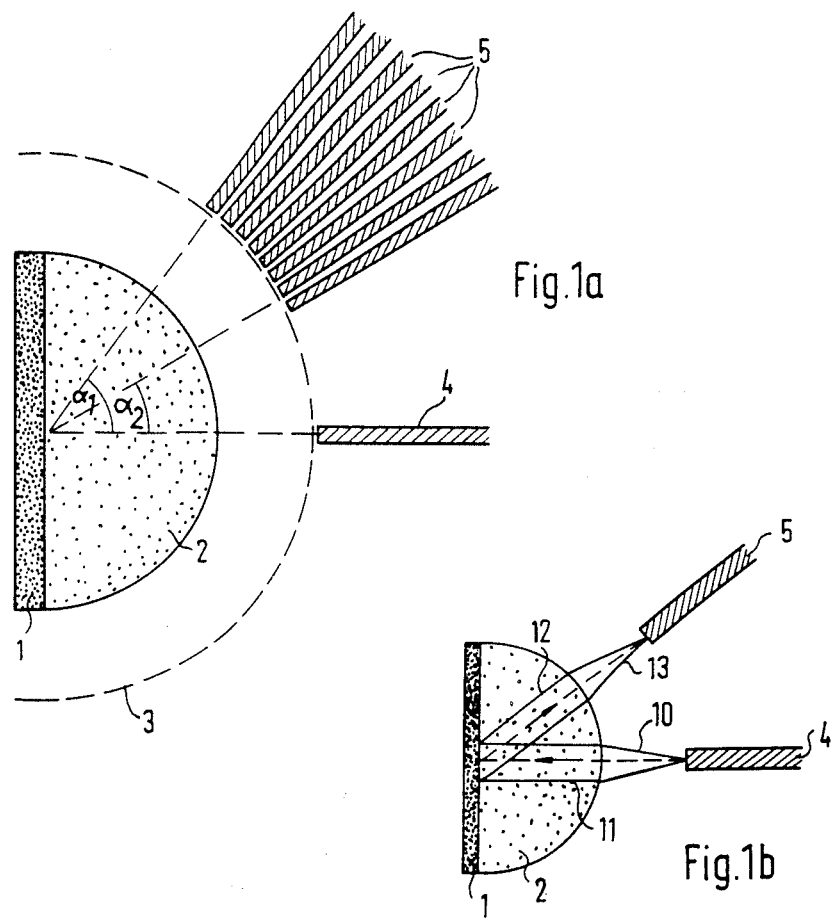
Fig.1a
Fig.1b
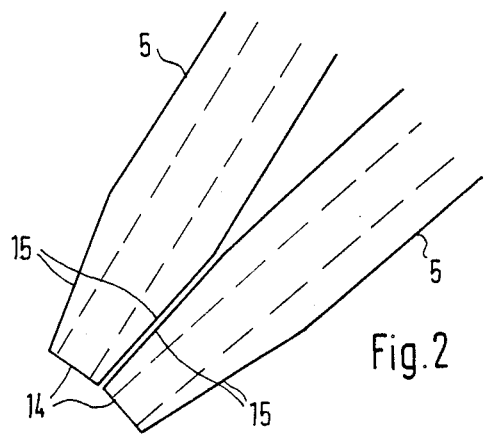
Fig.2

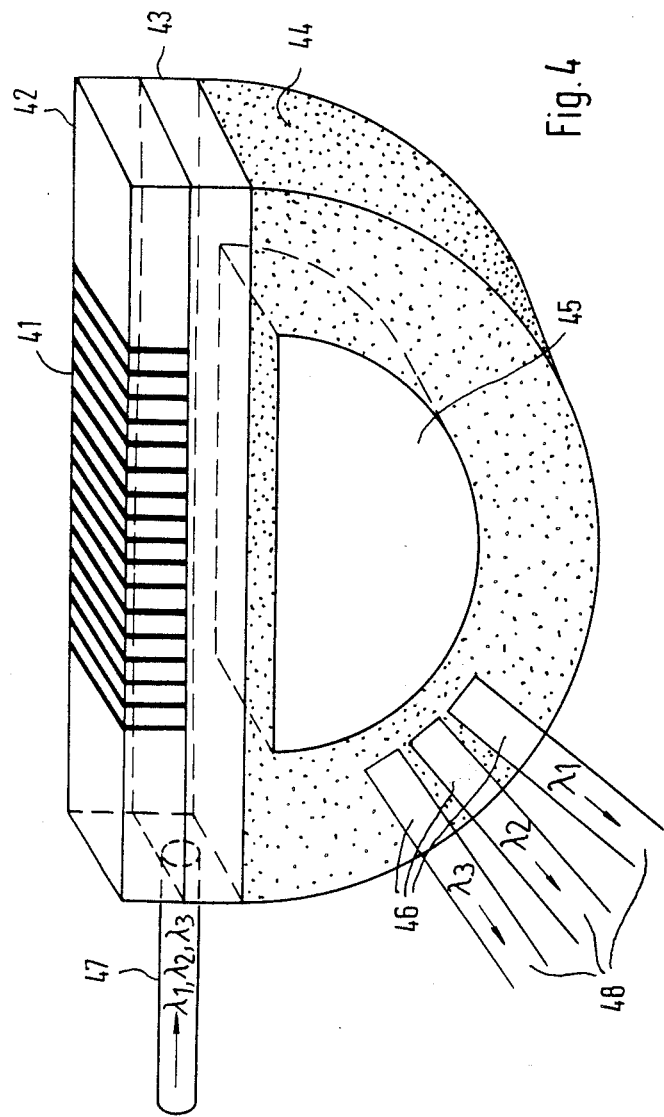

OPTICAL MULTIPLEXER/DEMULTIPLEXER

The present invention relates to an optical multiplexer/demultiplexer comprising an imaging lens and a reflection gratng. A device of this kind is described in NTZ, Vo. 37 (1984), No. 6, pp. 346–351, in an article entitled "Optischer Kugellinsen-Demultiplexer".

The object of the invention is to provide a multiplexer/demultiplexer which is easy to manufacture.

The advantages of the invention will become apparent from the following description.

Embodiments of the invention will now be explained in more detail with refernece to the accompanying drawings, in which:

FIG. 1a is a schematic view of a first embodiment;

FIG. 1b shows an example of the light path in the arrangement of FIG. 1a;

FIG. 2 shows a possible arrangement of the optical fibers;

FIG. 4 shows an embodiment in which the multiplexer/demultiplexer is implemented as an integrated optical device.

Figure 3:
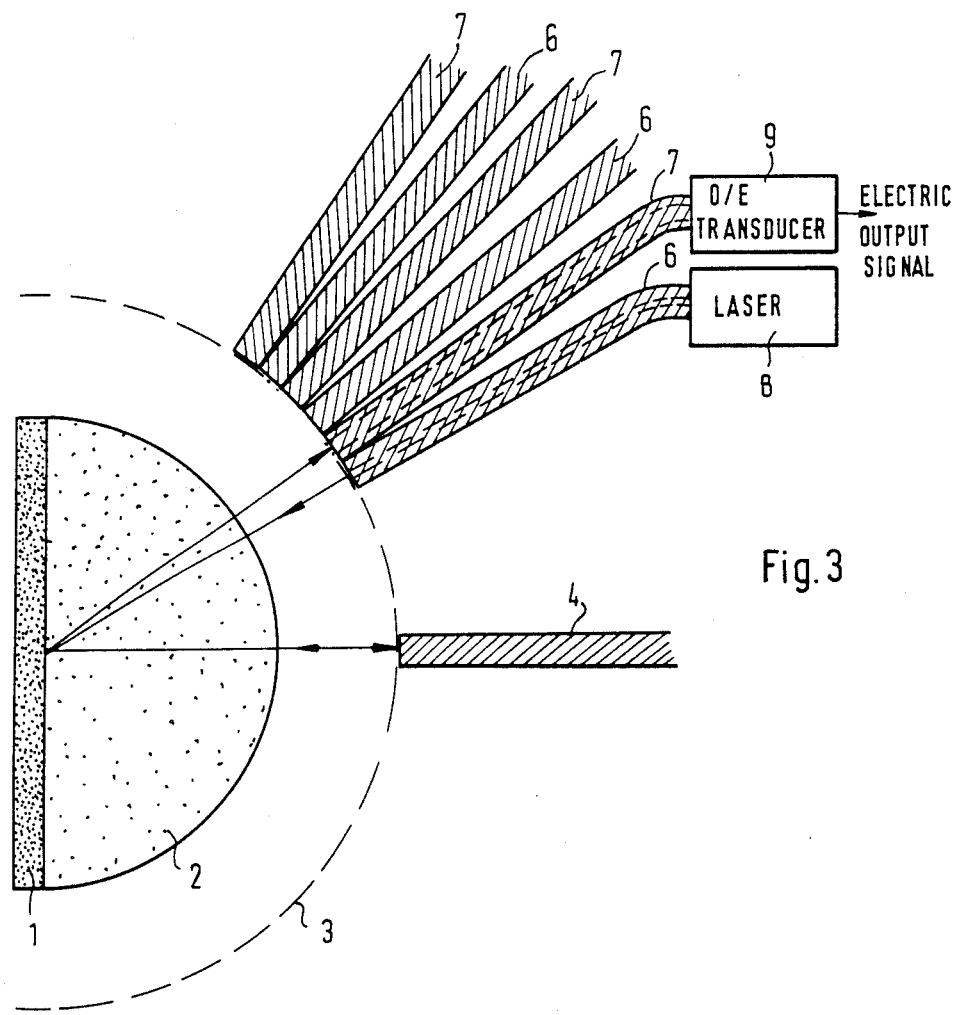
FIG. 3 is a schematic view of another mbodiment.

In the embodiment of FIG. 1a, the plane surface of a hemispherical lens 2 is provided with a reflection grating 1. The radius of the lens is 22.7 mm, the grating constant g is 3.3 $\mu$m, and the refractive index n of the glass of the lens is 1.66 (glass: LaKN12 of Schott) at a wavelength of 1.25 $\mu$M. Also provided are a single optical fiber 4 and a group of optical fibers 5. In the multiplex mode, the individual beams to be combined are guided to the multiplexer by the optical fibers 5, and the light beam consisting of components of different wavelengths is conducted away by the optical fiber 4. In the demultiplex mode, the light beam to be separated into its components of different wavelengths is coupled into the multiplexer through the optical fiber 4, and the individual components are conducted away by the optical fibers. The multiplexer/demultiplexer is a reciprocal component, so that it can be used both as a multiplexer and as a demultiplexer.

The beam path between the optical fiber 4 and one of the optical fibers 5 will now be explained with the aid of FIG. 1b. The lens 2 renders the diverging light emerging from the optical fiber 4 parallel, 11. From the parallel light 12 reflected at the reflection grating 1, the lens 2 produces convergent light 13, which is imaged on the optical fiber 5.

From this it follows that, in the arrangement shown in FIG. 1a, the distances between the optical fibers 5 and the center of the lens and the distance between the optical fiber 4 and the center of the lens must be equal to the focal length of the lens. The focal length, in turn, depends on, inter alia, the refractive index of the lens material, and the refractive index of the material is wavelength-dependent. Accordingly, the distances from the optical fibers 5 to the lens 2 must differ—if only slightly—if the light beam emerging from the lens 2 is to be imaged perfectly on the optical fibers. In practice, however, it will in many cases suffice to choose an average distance which is equal to the average value of the focal lengths for the individual wavelengths. The ends of the optical fibers 4 and 5 can thus be arranged on a line 3 concentric with the lens 2. It is known that a reflection grating deflects light of different wavelengths in different directions 1, 2. This is used in the multiplexer/demultiplexer to separate the light beam coupled into the demultiplexer through the optical fiber 4 into its individual components. To this end, the optical fibers 5 are so arranged that each of them is struck by the beam of the desired wavelength. Consequently, the angles between each of the lines joining the optical fibers 5 and the center of the lens 2 and the line joining the optical fiber 4 and the center of the lens 2 depend on the grating constant g and the respective wavelength.

A practical realization of the multiplexer/demultiplexer may look like this. The lens 2, the reflection grating 1, and one portion of each of the optical fibers 4 and 5 are arranged inside a housing, while the other portion of the optical fibers 4 and 5 protrudes from the housing. To these protruding fiber tails, other optical fibers may be joined by splicing. It is also possible to connect the optical fibers 4 and 5 arranged within the housing to the other optical fibers by means of connectors mounted in the wall of the housing.

To minimize optical losses and spherical and chromatic aberration, the reflective index n of the material of the lens is chosen to be as large as possible.

The novel multiplexer/demultiplexer is easy to manufacture. In a first manufacturing method, a reflection grating 1 is cemented onto the plane surface of the hemispherical lens, the refractive index of the optical cement being equal to the lens material index. In a second manufacturing method, the reflection grating 1 is produced directly on the plane surface of the hemispherical lens by scribing, and the back surface is provided with a reflective coating of gold or silver.

To ensure that the grating MUX/DEMUX reaches an optical channel bandwidth that matches the spectral widths of the lasers used, it is desirable to space the optical fibers 5 as close together as possible. That is the case if individual fibers abut on each other. The distance between the cores of contiguous fibers on which the light beams to be coupled out are imaged is then determined by the outside diameters of the fibers. To obtain a small distance between the cores 14 (FIG. 2) of the optical fibers 5, it is advantageous to grind the ends 15 of the fibers.

Multiplexer/demultiplexers are used, for example, at the terminals of bidirectional transmission paths. In many cases, light of different wavelengths is used for the two directions of transmission on such a path. A multiplexer/demultiplexer that is especially suited for such an application will now be explained with the aid of FIG. 3.

Like in the embodiment of FIG. 1, a hemispherical lens 2 is provided with a reflection grating 1. Through an optical fiber 4, the light beam is coupled into the demultiplexer or conducted away from the multiplexer. Unlike the embodiment of FIG. 1 where a number of like optical fibers 5 are provided, the embodiment of FIG. 3 contains an arrangement of alternate single-mode optical fibers 6 and multimode optical fibers 7. This has the following advantage. Multimode optical fibers have a greater core diameter than single-mode optical fibers. As a result, less stringent requirements have to be placed on the imaging of the light beams to be coupled into the multimode optical fibers 7 in the demultiplex mode. It suffices to make the distance between the optical fibers 7 and the lens 2 equal to the average value of the distances that would be required to image the light perfectly on the optical fibers. The arrangment is such that the multimode optical fibers 7 are used only for the demultiplex mode. The single-mode optical fibers 6 between the multimode optical fibers 7 are used for the multiplex mode. Through them, light beams of different wavelengths are transmitted which are directed through the lens 2 to the reflection grating 1. After being reflected from the reflection grating 1 to the optical waveguide 4, they are conducted away by the latter.

What was said about the practical realization of the embodiment of FIG. 1 applies analogously to the multiplexer/demultiplexer of FIG. 3, i.e., that the lens 2, the reflection grating 1, and the optical fibers 4, 6, and 7 are contained in a housing, and that optical-fiber tails protrude from the housing. The housing may also contain the lasers 8, which emit the light beams to be combined, and the optical-to-electrical transducers into which the light beams produced by the demultiplexer are coupled. If the optical-to-electrical transducers and the lasers 8 are contained in the housing, too, one optical fiber 4 and electric leads will protrude from the housing. A highly compact component is obtained.

Instead of a hemispherical lens 2, lenses having other shapes can be used; it is only necessary that there be a plane surface on which the reflection grating can be formed. An advantageous lens shape is a paraboloidal shape, which gives good results as far as spherical aberration is concerned.

Reflection losses are minimized if linearly polarized light is directed to the grating and if the principal plane of polarization is perpendicular to the lines of the grating. This requires that the optical fibers 4 and 5 (or 6) be polarization-conserving optical fibers.

To minimize the insertion loss per wavelength channel in the grating multiplexer/demultiplexer, the hemispherical lens surface and the ends of the optical fibers are provided with antireflection coatings.

The multiplexer/demultiplexer can be implemented to advantage as an integrated optical device. An example will now be explained with the aid of FIG. 4.

It should be understood that some of the above described features may also be applicable to such an integrated optical device.

A grating is used which is formed in a photoresist material. This is known per se, see, for example, a book by H. G. Unger entitled "Optische Nachrichtentechnik", Elitera-Verlag, pp. 107–114. The device further includes a film optical waveguide, which is known per se as well, e.g., from the same book by H. G. Unger, p. 19. If a photoresist with such a grating is applied to a film optical waveguide, optical reflection occurs, with the angles of reflection being wavelength-dependent, see the book "Topics in Applied Physics", Vo. 7, Springer-Verlag, Berlin, 1979, pp. 110–112, especially FIG. 3.14b on page 112.

In the embodiment, light containing three wavelengths $\lambda_1$, $\lambda_2$, $\lambda_3$ is guided along a single-mode optical fiber 47 and coupled into the multiplexer/demultiplexer (the explanation will be given for the "demultiplexer" mode) from the left. The light is parallel and propagates in a sheetlike film optical wavguide 43. Disposed over the film optical waveguide 43 is the grating 41 formed in a photoresist material 42. as mentioned above. The grating acts as a reflection diffraction grating. Its operation is known from the references cited above. A portion of the light is reflected in the desired directions, and the other portion passes through the photoresist layer. To minimize losses, a reflective film (not shown), e.g., a silver film, is applied to the photoresist layer.

In the representation chosen, in which the light is incident from the left, the wavelength-dependent reflections are directed toward the lower left.

In these directions, there is a transparent substrate 44, e.g., a lithium-niobate substrate, which is joined to the film optical waveguide 43. The reflected parallel light propagates in the substrate and strikes a converging lens 45 in the substrate. The lens is implemented by a suitable (e.g., parabolic) refractive index profile in a manner known per se. To obtain this profile, a controlled amount of titanium dioxide is diffused into the lithium-niobate substrate during manufacture.

Also implemented in the substrate 44 are optical waveguides 46 which are so arranged relative to each other and to the lens 45 that one of the reflected light beams of wavelength $\lambda_1$, $\lambda_2$, or $\lambda_3$ is imaged on each of them. These optical waveguides are connectable to optical fibers 48, by which the light beams of different wavelengths are conducted away.

The integrated optical device described here for the demulitplexer mode can also be used as a multiplexer. Furthermore, the above-mentioned lasers and optical-to-electrical transducers may be incorporated into the device. Low reflection losses at the grating are obtained with a blazed sawtooth grating.

I claim:

1. An integrated optical multiplexer/demulitplexer comprising:
   a transparent substrate having an upper planar surface;
   a diffused region in said substrate and extending downwardly from said planar surface to form an imaging lens;
   a film deposited on said upper planar surface to form a planar waveguide above said imaging lens;
   a grating defined in a photoresist material applied above said film to form a reflective diffraction grating above said waveguide;
   a single-mode fiber directly optically coupled to said waveguide;
   a plurality of waveguides defined in a portion of said substrate adjacent a portion of said imaging lens remote from said upper surface and oriented with respect to said lens and said grating so as to each receive a different wavelength of light, when said multiplexer/demultiplexer is functioning as a demultiplexer or transmit a different wavelength of light, when said multiplexer/demultiplexer is functioning as a multiplexer.

2. An optical multiplexer/demultiplexer as claimed in claim 1, wherein the angles between the individual ones of said plurality of waveguides and the single said single-mode optical fiber are chosen in accordance with the respective wavelength and the grating constant.

3. An optical multiplexer/demultiplexer as claimed in claim 2, characterized in that said plurality of fiber optic waveguides consists of alternate single-mode and multi-mode optical fibers.

4. An optical multiplexer/demultiplexer as claimed in claim 2, characterized in that at least part of the optical fibers are polarization-conserving optical fibers which are so arranged that the principal plane of polarization defined by them is perpendicular to the lines of the grating.

5. An optical multiplexer/demultiplexer as claimed in claim 3, characterized in that each of the single-mode optical fibers is connected to a light source.

6. An optical multiplexer/demultiplexer as claimed in claim 3, characterized in that each of the multi-mode optical fibers is connected to an optical-to-electrical transducer.

* * * * *